United States Patent

Hollar

[15] 3,637,078
[45] Jan. 25, 1972

[54] DIRECTIONAL FLOW FLUID FILTER
[72] Inventor: Bartley Douglass Hollar, Longmont, Colo.
[73] Assignee: Gould Inc., Mendota Heights, Minn.
[22] Filed: June 22, 1970
[21] Appl. No.: 48,325

[52] U.S. Cl. ................................210/73, 210/304, 210/456, 210/493
[51] Int. Cl. ..................................................B01d 27/06
[58] Field of Search..................210/304, 512, 493, 73, 456; 55/456, 457, 521

[56] References Cited

UNITED STATES PATENTS

| | | |
|---|---|---|
| 1,822,006 | 9/1931 | Bull........................210/304 |
| 2,708,521 | 5/1955 | Saloum......................55/456 X |
| 3,078,650 | 2/1963 | Anderson et al............55/521 X |
| 3,508,383 | 4/1970 | Humbert et al.............210/304 X |

*Primary Examiner*—Frank A. Spear, Jr.
*Attorney*—Stryker and Jacobson

[57] ABSTRACT

A fluid filter is disclosed incorporating a pleated filtering element disposed in a generally cylindrical housing. a helically shaped flow vane is disposed so as to spiral about the pleated element and to induce the flow of the fluid flowing through the filter to travel generally across the pleats rather than along the pleats, thus directing the flow over a larger percentage of the total area of the filtering medium.

16 Claims, 4 Drawing Figures

INVENTOR
BARTLEY DOUGLAS HOLLAR

BY
ATTORNEYS

INVENTOR
BARTLEY DOUGLAS HOLLAR

DIRECTIONAL FLOW FLUID FILTER

BACKGROUND OF THE INVENTION

In the prior art, fluid filters and particularly oil filters for internal combustion engines have utilized pleated filter paper elements disposed in a metal housing to perform the filtering function. In these types of prior art devices, oil generally enters the filter through inlet ports at one end of the metal housing. The oil flows radially outward to the walls of the housing and surrounds the pleated paper filter element. The oil is then forced through the filter paper to a central chamber from which the oil exits the filter through a central opening or outlet port at the end of the metal housing. Since the flow of oil in these devices is generally in a direction parallel to the paper pleats, the flow is believed to be concentrated primarily on the innermost fold of the pleats. This area constitutes only a small percentage of the total available filtering area and, because of the fold, is a structurally weak area; thus, small tears and cracks can develop in this weakened area due to the concentrated pressure. The initial filtration efficiency of these weakened areas is relatively low, increasing as sufficient particulate deposits accumulate in the creases. When the particulate deposits accumulate in sufficient quantity for the creases to become blocked, the oil begins to flow through the more outward portions of the filter element using a consequently greater area of filter paper and achieving a somewhat higher efficiency. It would be preferable, however, if the fluid being filtered would pass through the total area of the filter element to provide higher initial efficiency and an overall increase in efficiency of filtering. The present invention is directed toward accomplishing this end and avoiding the above-mentioned problems.

SUMMARY OF THE INVENTION

Briefly, the present invention contemplates a helically shaped vane disposed about the folded or pleated cylindrical filter element in order to induce or direct the flow of fluid transverse to the pleated folds. The flow, being directed across a greater area of the faces of the pleats rather than permitting random or undirected flow into the narrow folds, causes a substantial decrease in the pressure per unit area of the filter element and results in a greatly increased filtration efficiency. The present invention, in contrast to prior art filters, provides greatly improved filtration efficiency, both initially and throughout the useful life of the filter, without any sacrifice in the filter's useful life. In the case of an oil filter, use of this invention results in a substantial improvement in oil filtration and will result in subsequent reduction in engine wear and service costs. Tests conducted on several variations of the preferred embodiment have demonstrated a substantial increase in the initial efficiency, and the substantial increase in efficiency has remained throughout the useful life of the filter. As a result, it may be seen that it is an object of the present invention to provide an improved fluid filter which makes more efficient use of the filtering element therein. It is another object of the present invention to provide a filter with a flow vane incorporated therein to direct fluid flow generally transverse to the folds in the filtering medium. Further objects and advantages will become apparent upon consideration of the following description and drawings.

DESCRIPTION OF THE PREFERRED EMBODIMENT

Figure 1:
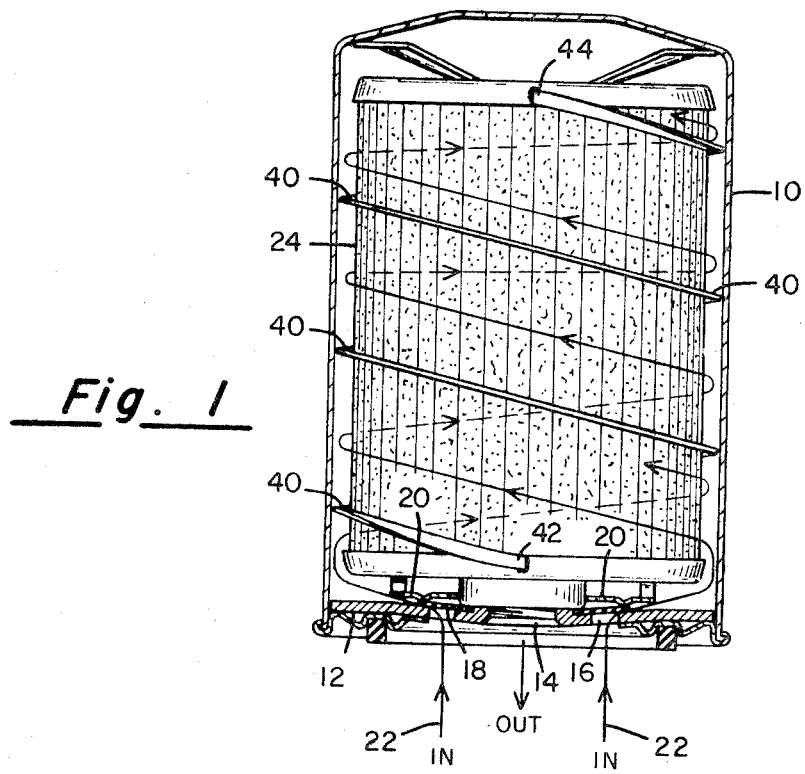
FIG. 1 is a schematic side view of a filter incorporating the present invention in which a cylindrical filtering element is shown inside the housing with the housing shown in section.
Figure 3:
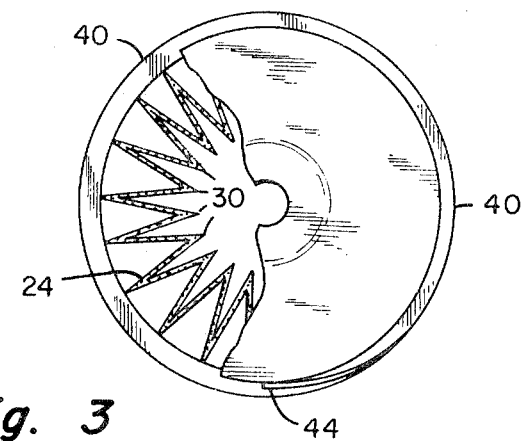
FIG. 3 is a schematic, partially cutaway, overhead view of just the cylindrical filtering element and direction control vanes of FIG. 2.

In FIG. 1, a preferred embodiment of the invention is shown in which the present invention is applied to an oil filter. It should be understood that the present invention has utility with all types of fluid filters in which a folded or pleated, cylindrical filtering element is utilized. It may be employed with a cartridge-type filter, a permanent type or a throwaway type having an integral filter element and housing. Broadly speaking, the invention comprises the use of a mechanical deflector to induce or direct a fluid generally transverse to the filter element; however, for the purposes of this disclosure, a typical internal combustion engine oil filter, incorporating the present invention, is disclosed. In FIG. 1, housing 10 is closed at one end by a suitable pressure ring 12 which has a central outlet opening or port 14 and a number of inlet holes or ports 16, spaced radially outward from the outlet port. In the embodiment illustrated, the oil enters the filter through entrance holes 16. The pressure of the oil displaces a baffle 18 against a spring 20 to allow the oil to enter the interior of housing 10. The direction of flow is generally indicated in FIG. 1 by a set of arrows 22. A pleated-paper filtering element 24 is disposed within the cylindrical housing 10 in a manner well known to those skilled in the art. A brief reference to FIG. 3 will demonstrate the general configuration of the pleats of the paper element 24. At the top of housing 10 is a pressure relief valve 26 which, although not used in all types of filters, is shown in this typical embodiment. The relief valve may be better seen in FIG. 2.

Figure 2:
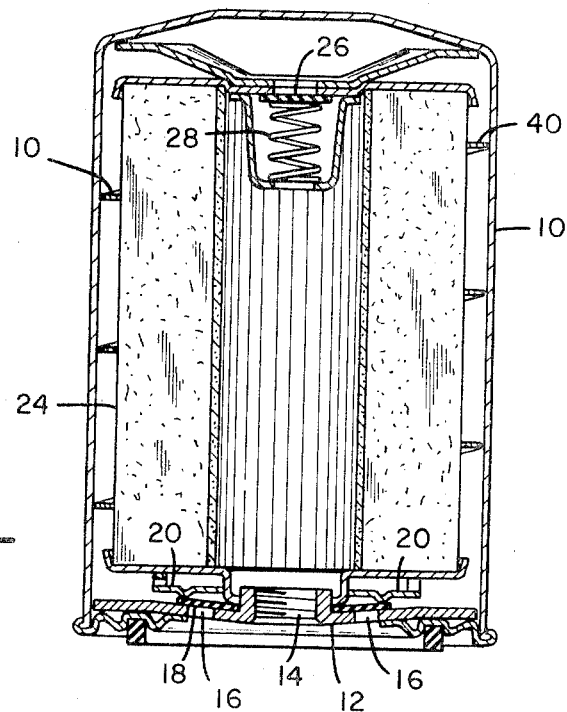
FIG. 2 is essentially the same as FIG. 1 except that the housing, the filter element and the directional control vanes are shown in section.

In FIG. 2 pressure relief valve 26 is held closed by a spring 28 until the oil pressure becomes sufficient to displace spring 28, allowing passage of the oil directly into the central portion of element 24. The oil exits the filter through opening 14 from the central portion of element 24 after having passed either through the filter element 24 or the pressure relief valve 26. As discussed earlier, the structure described so far is similar to typical prior art devices, and the primary difficulty with this particular type of prior art filter is that the oil passing along the outside of filter 24 flows generally parallel to the pleats. It is believed that most of the filtering action in prior art filters takes place deep in the folds of the filter at the points indicated generally by the number 30 in FIG. 3. Since a sharp fold is present at point 30, this area of the filter is structurally weaker than the rest of the filter, thus providing less consistent filtration. In addition, efficiency is greatly reduced by using only a small area of the filtering medium. The present invention provides a substantial improvement in filtration efficiency by the addition of a helical flow vane 40 which may be disposed about the filter element 24. The vane 40 may be mounted about the filter element before the element is inserted into housing 10 or after assembly. Another possibility is to mount vane 40 to the inside of the housing 10. The addition of helical flow vane 40 directs or induces the oil to flow substantially along the paths indicated by the arrows in FIG. 1, generally across or transverse to the pleats; thus the oil is in contact with the filter element for a longer period of time. Furthermore, the transverse flow of the oil induces filtration through the outer portions of the pleats rather than the inner folds, thereby making use of more of the filtration area provided by the filter element. If desired, and depending upon the vane material used, helical vane 40 may be spotwelded, soldered, or otherwise secured to filter element 24 at points 42 and 44 or any other convenient points so as to help locate and stabilize vane 40, although this is not necessary. Vane 40 may also be left loose at its ends or embedded in the sealing material at each end of the filter element. The particular shape of spiral shown in the drawings is also optional. More or fewer turns of the spiral may be provided depending on the amount of delay desired in the flow of the fluid. The vane may be positioned in a clockwise or counterclockwise configuration. In the preferred embodiment, helical vane 40 may be permitted some degree of flexibility in the axial direction, thus permitting slight movement of the various portions of the vane over a limited range.

Figure 4:
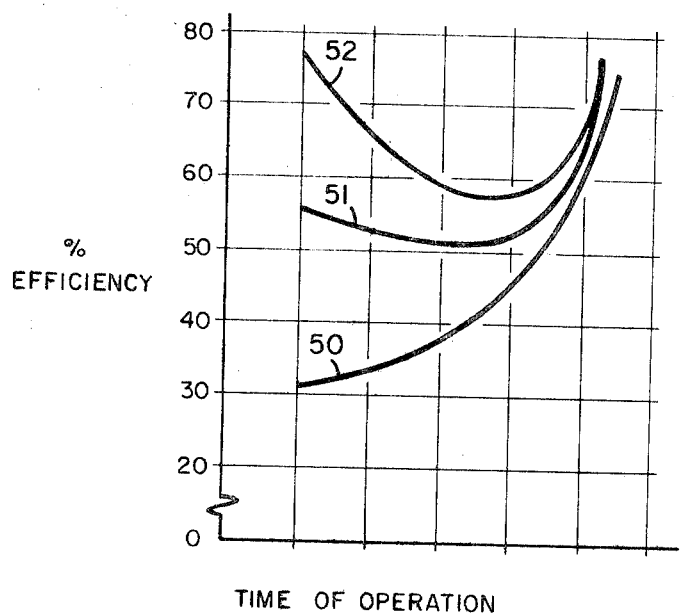
FIG. 4 is a graph comparing the efficiency of the filter of the present invention with a conventional filter.

In the preferred embodiment, a thin metal strip, having a rectangular cross section, is used to form helical vane 40. However, it should be understood that the vane may be constructed from any material which will withstand the conditions encountered in service; thus, composition, plastic, metal, rubber, string, paper and the like, or any combination of these materials may be used. The vane cross section may be rectangular, cylindrical, square or any modification thereof, although a thin rectangular version is shown and has been found through tests to be the most desirable configuration. The results of these tests are shown in graph form in FIG. 4 where the efficiencies of several filters are plotted on the vertical axis as a function of their operating time shown on the horizontal axis. Curve 50 exemplifies a typical filter constructed as shown in the drawings except without any vane. It may be seen that the efficiency is initially rather low building to higher values after a period of operation. The same type of filter was modified by adding a cylindrical cross section helical vane. When tested, this filter performed as shown by curve 51 demonstrating a much higher initial efficiency and an overall improvement in efficiency during its operating life. The best results, however, were obtained by adding a helical vane with a rectangular cross section to the basic filter. This modification operated as shown by curve 52 with a very high initial, interim, and final efficiency proving conclusively the vast improvement afforded by the present invention.

The vane need not extend totally across the space between housing 10 and filter element 24 as is shown, but may occupy a lesser width positioned either against the filter element, against the housing wall 10 or free standing. It has been found that a vane extending from the inner periphery of the housing to the outer periphery of the filter element is more efficient in inducing or directing the flow of the fluid transverse to the pleats of the filter element. However, even a partial guide tends to divert the flow of fluid into a helical direction as shown in FIG. 1. Other modifications of the invention are possible, such as utilizing a thicker vane of rectangular cross section, or a wire vane of circular cross section.

Thus, it may be seen that a fluid filter is provided having a much increased initial efficiency and an increased efficiency of operation throughout the useful life of the filter by controlling the direction of fluid flow to more effectively utilize the available surface area of the filter medium. A number of constructional variations have been discussed above which do not depart from the spirit and scope of the invention. Other such variations include the use of a discontinuous helical vane or two or more helical vanes spiraling alternately or consecutively about the filter medium thus justifying the following claims which are not limited to the particular apparatus shown in the drawings, but which encompass modifications which rightfully fall within the novel subject matter of the present invention.

I claim:

1. A fluid filter comprising in combination:
a housing;
a folded filter element disposed in said housing;
a fluid inlet port in said housing adapted to receive fluid from a fluid supply;
a fluid outlet port in said housing communicating with said inlet port through said filter element and adapted to direct fluid flow from said housing; and
fluid flow-directing means disposed in said housing positioned immediately adjacent the folds of the filter element on the fluid inlet side of said filter element and positioned with an unobstructed path between said flow directing means and said filter element so as to induce fold-impinging flow of the fluid generally transverse to the folds of the filter.

2. The apparatus of claim 1 in which said folded filter element is formed generally in a pleated cylindrical shape.

3. The apparatus of claim 2 in which said housing comprises a generally cylindrical container and the pleats of said filter element are generally parallel to the axis of the cylindrical housing.

4. The apparatus of claim 3 in which said fluid flow-directing means are disposed between said pleated filter element and the walls of said housing.

5. The apparatus of claim 2 in which said fluid flow-directing means comprise a generally helical member disposed about the circumference of said cylindrical-shaped pleated filter element.

6. The apparatus of claim 5 in which said inlet port communicates with the space between the housing and the filter element and said outlet port communicates with the inside of said cylindrical filter element.

7. The apparatus of claim 1 in which said fluid flow-directing means comprise a helical vane.

8. The apparatus of claim 7 in which said helical vane is disposed between said housing and said filter element and is positioned to induce fluid flow generally transverse to the folds of the filter element.

9. The apparatus of claim 7 in which the helical vane member comprises a strip of metal disposed in said space between the housing and the filter element.

10. The apparatus of claim 9 in which said strip of metal extends in width from said filter element to said housing.

11. The apparatus of claim 10 in which said helical strip of metal is secured at the top and bottom of said filter element.

12. The apparatus of claim 11 in which said cylindrical pleated filter element comprises a paper composition filter element.

13. A fluid filter comprising in combination:
a housing;
a pleated generally cylindrical filter element disposed in said housing, defining a first space between said filter element and said housing and a second space within said cylindrical filter element;
a fluid inlet port in communication with the inside of said cylindrical filter element; and
helically shaped vane means positioned immediately adjacent to the filter element with an unobstructed path between the vane means and the filter element so as to induce fold impinging fluid flow transverse to the pleats of the filter element.

14. In a fluid filter having a housing and a pleated filter element disposed in said housing, the improvement comprising: fluid flow-directing means disposed between the element and the housing in a position with an unobstructed path between the flow-directing means and the filter element so as to induce fold-impinging fluid flow transverse to the pleats of said filter element.

15. The apparatus of claim 14 in which said fluid flow-directing means comprise a helical vane.

16. A method for directing the flow of fluid in a filter having a substantially cylindrical pleated filter element comprising the step of mechanically deflecting the direction of fluid flow into a path generally transverse to and impinging against the pleats of the element.

* * * * *